United States Patent [19]
Onishi et al.

[11] Patent Number: 5,430,579
[45] Date of Patent: * Jul. 4, 1995

[54] APPARATUS FOR DIGITALLY RECORDING ANALOG VIDEO SIGNALS IN ORDINARY AND LONG MODE

[75] Inventors: Ken Onishi; Hidenori Banjyo; Yukari Arano, all of Nagaokakyo, Japan

[73] Assignee: Mitsubishi Denki Kabushiki Kaisha, Tokyo, Japan

[*] Notice: The portion of the term of this patent subsequent to Aug. 2, 2011 has been disclaimed.

[21] Appl. No.: 230,155

[22] Filed: Apr. 19, 1994

Related U.S. Application Data

[63] Continuation of Ser. No. 147,035, Nov. 4, 1993, Pat. No. 5,335,116, which is a continuation of Ser. No. 979,554, Nov. 20, 1992, abandoned, which is a continuation of Ser. No. 518,112, May 3, 1990, abandoned.

[30] Foreign Application Priority Data

May 9, 1989 [JP] Japan ............... 1-115738
May 9, 1989 [JP] Japan ............... 1-115739

[51] Int. Cl.⁶ .......................... H04N 5/782
[52] U.S. Cl. .................. 360/9.1; 360/32; 360/40; 360/64; 360/73.13
[58] Field of Search ........ 360/8, 9.1, 10.3, 13, 360/27, 32, 40, 47, 53, 64, 73.07, 73.09, 73.13

[56] References Cited

U.S. PATENT DOCUMENTS

| | | | |
|---|---|---|---|
| 4,490,755 | 12/1984 | Tokuyama | 360/73.09 |
| 4,761,693 | 8/1988 | Higashi et al. | 360/13 |
| 4,769,722 | 9/1988 | Itoh et al. | 360/27 |
| 4,772,961 | 9/1988 | Ichinoi | 360/9.1 |
| 4,862,292 | 8/1989 | Enari et al. | 360/8 |
| 4,887,169 | 12/1989 | Bannai et al. | 360/64 |
| 4,905,104 | 2/1990 | Okamoto et al. | 360/70 |
| 4,920,242 | 4/1990 | Hosaka et al. | 360/9.1 |
| 5,045,955 | 9/1991 | Ikeda | 360/9.1 |
| 5,063,453 | 11/1991 | Yoshimura et al. | 360/32 |
| 5,335,116 | 8/1994 | Onishi et al. | 360/9.1 |

FOREIGN PATENT DOCUMENTS

| | | |
|---|---|---|
| 0112534 | 7/1984 | European Pat. Off. |
| 3722577 | 1/1988 | Germany |
| 3819393 | 12/1988 | Germany |
| 62-26606 | 2/1987 | Japan |
| 62-137771 | 6/1987 | Japan |

OTHER PUBLICATIONS

"An experimental digital video tape recorder" by Yokoyama, SMPTE Journal, vol. 89, Mar. 1980, pp. 173–180.

Primary Examiner—W. R. Young
Attorney, Agent, or Firm—Wolf, Greenfield & Sacks

[57] ABSTRACT

A digital video recording system for digitizing analog video signals and recording the digital signals on video tape and for reading digital video signals from video tape and producing an analog video signal. The recording system comprises an A/D converter, a data compressor for compressing digital video signals at a data rate of 1/N (N an integer greater than 1), an encoding and modulating mechanism that provides digital data segments, and a control mechanism for controlling the system such that recording data for one field, which is normally recorded in M tracks (M: an integer greater than N) in ordinary recording mode, is recorded in about M/N tracks in a long recording mode.

18 Claims, 8 Drawing Sheets

APPARATUS FOR DIGITALLY RECORDING ANALOG VIDEO SIGNALS IN ORDINARY AND LONG MODE

This application is a continuation of application Ser. No. 08/147,035, filed on Nov. 4, 1993 of Ken Onishi, et al., U.S. Pat. No. 5,335,116 which is a continuation of application Ser. No. 07/979,554, filed on Nov. 20, 1992, now abandoned, which in turn is a continuation of application Ser. No. 07/518,112, filed on May 3, 1990, now abandoned.

BACKGROUND OF THE INVENTION

1. Field of the Invention

The present invention relates to digital video signal recording system and apparatus for recording digital video signals on a magnetic tape. More particularly, the present invention relates to digital video signal recording system and apparatus operated both in an ordinary recording mode and in a long recoding mode which enables recording for N (N: an integer) times as long hours as those in an ordinary recording mode.

2. Description of the Related Art

As an apparatus for recording picture information and sound information on a magnetic tape, an analog video tape recorder (VTR) such as a VHS VTR is conventionally known.

Figure 10:
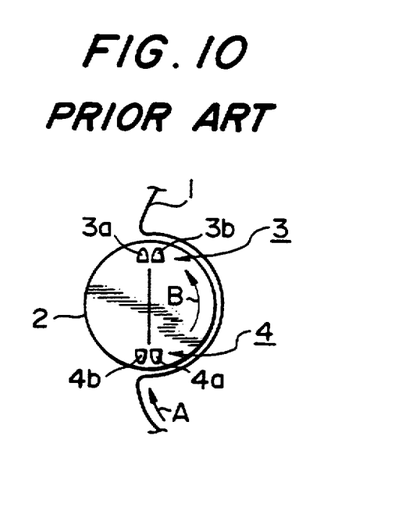
FIG. 10 schematically shows the structure of a conventional video signal recording apparatus in the vicinity of the rotary drum.

FIG. 10 schematically shows a general magnetic recording/reproducing means in a VTR.

In FIG. 10, a magnetic tape 1, a rotary drum 2 and rotary heads 3 and 4 are shown.

The magnetic tape 1 travels in parallel with the plane of the drawing, while the rotary drum 2 rotates in the state of being inclined at a predetermined angle with respect to the direction vertical to the plane of the drawing.

The rotary heads 3 and 4 are provided on the periphery of the rotary drum 2 in such a manner as to come into contact with the magnetic tape 1. Since the magnetic tape 1 is wound half around the periphery of the rotary drum 2, the magnetic tape 1 is scanned with the rotary heads 3 and 4 in an oblique direction. Consequently, the area of the magnetic tape 1 scanned in one cycle, what is called a track, is situated obliquely relative to the longitudinal direction of the magnetic tape 1.

If the rotary drum 2 is rotated at a rate of about 1,800 rpm so as to record analog video signals for 1 field per track, recording is carried out at a speed of 1 field/about 60 sec.

Figure 11:
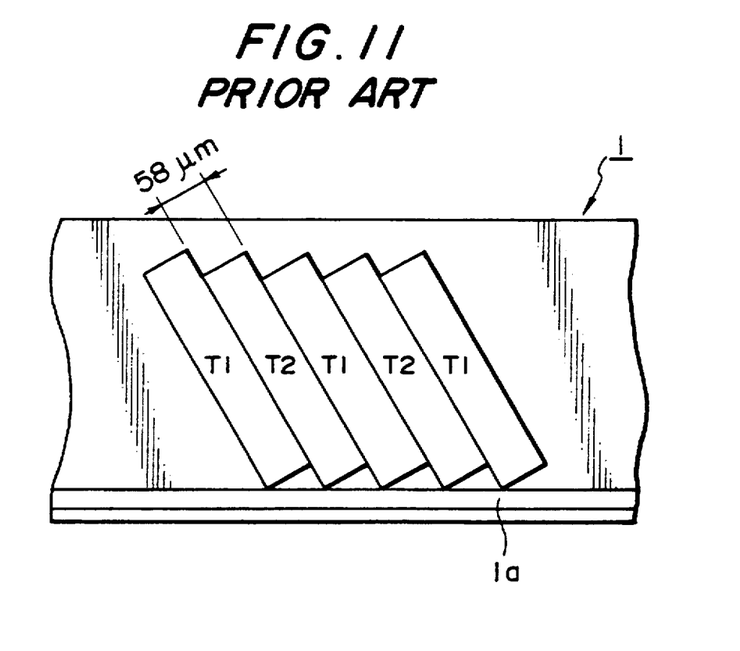
FIG. 11 shows the track pattern for recording in an ordinary recording mode in the conventional video signal recording apparatus.
Figure 12:
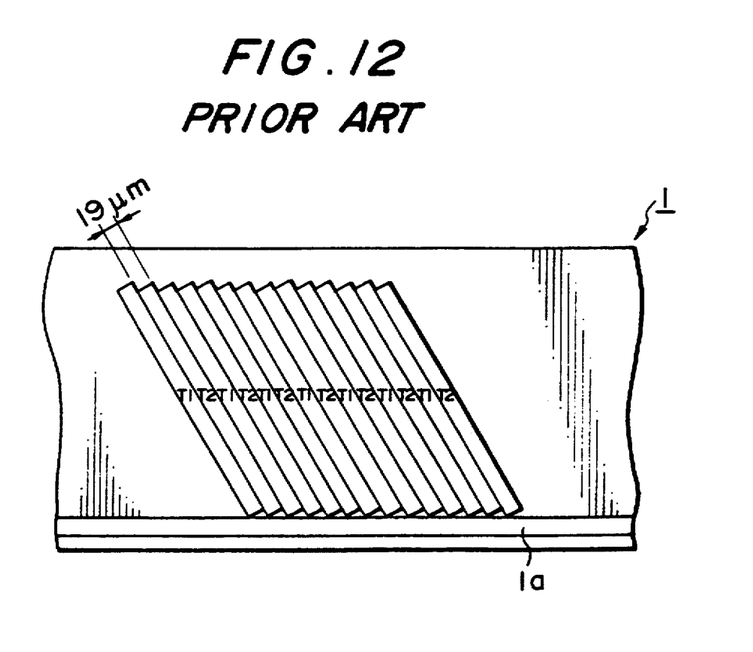
FIG. 12 shows the track pattern for recording in a long recording mode in the conventional video signal recording apparatus.

A VTR operated both in an ordinary recording mode and in a long recording mode is known. FIGS. 11 and 12 show the patterns of the tracks T1 and T2 in such a VTR in an ordinary recording mode and a long recording mode, respectively. In the case of a VHS system, the widths of the tracks T1, T2, namely, the track pitches are about 58 μm and 19 μm in an ordinary recording mode and a long recording mode, respectively.

In FIGS. 11 and 12, a belt-like control track (hereinunder referred to as "CT") 1a is provided in the longitudinal direction of the magnetic tape 1.

If the video signal recorded on the magnetic tape 1 is an NTSC video signal, a signal having a frequency of 30 Hz is recorded as a CT signal. The CT signal is a signal for controlling the travelling speed of the magnetic tape 1 by a servomechanism.

In order to realize the track patterns in both ordinary recording mode and long recording mode by one apparatus, each of the rotary heads 3 and 4 is composed of heads 3a, 3b and 4a, 4b, respectively, which have different scanning track widths from each other, (each of the rotary heads 3 and 4 is composed of what is called a combination head), as shown in FIG. 10 and the travelling speed of the magnetic tape 1 is changed in accordance with the mode.

Figure 13:
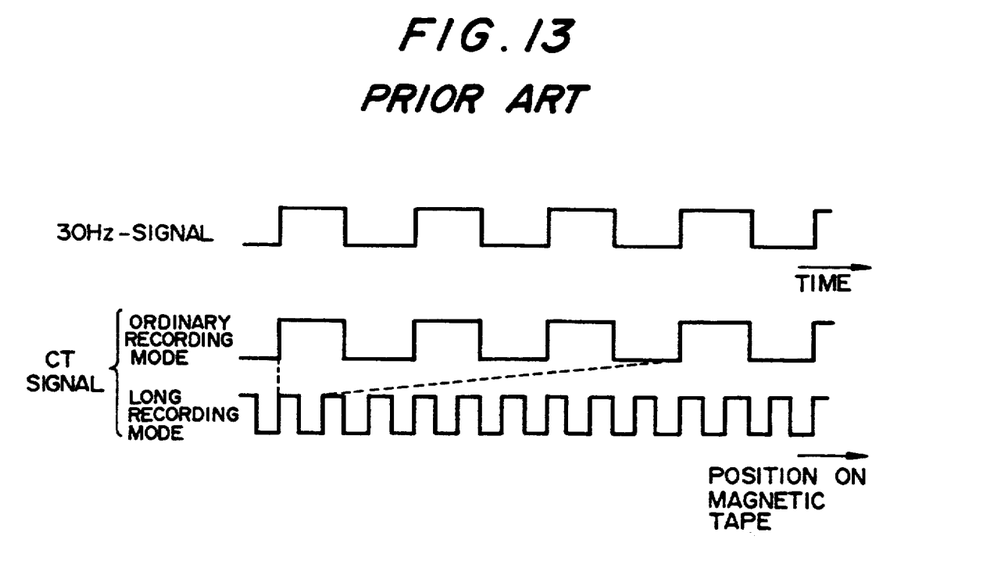
FIG. 13 is an explanatory view of a CT signal recorded in a control track.

For example, in a long playing mode for recording for N times as long hours as those in an ordinary recording mode, the travelling speed of the magnetic tape 1 is reduced to 1/N. In this case, as shown in FIG. 13, the period in which the CT signal is situated on the magnetic tape 1 in a long recording mode is reduced to 1/N of the period in an ordinary recording mode.

In reproducing the video signals recorded on the tracks T1 and T2, the CT signals are simultaneously reproduced from the CT 1a. If the travelling speed of the magnetic tape 1 is controlled by a servomechanism so that the reproduced CT signal has a frequency of 30 Hz (the frequency of a CT signal recorded in an ordinary recording mode) both in an ordinary recording mode and in a long recording mode, it is possible to reproduce the video signals.

In this way, recording/reproducing is conventionally possible both in an ordinary recording mode and in a long recording mode. However, the quality of the video signal reproduced in a long recording mode is inferior to that in an ordinary recording mode, because the track pitch is smaller. For this reason, a long recording mode is conventionally adopted when the reproduced video signals are not specially required to have a high quality or when long recording is necessary.

The above explanation is as to a system for recording analog signals on a magnetic tape. When the principle of this system is applied to recording of digital video signals on a magnetic tape, the following problems are produced.

a) In recording a digital video signal, it is necessary to keep the areal recording density and the linear recording density at the optimum values in order to secure a reproducing output. However, the areal recording density becomes small when the track pitch is small. Therefore, if the track pitch is reduced in a long recording mode, it is impossible to obtain an adequate reproducing output as in recording analog video signals.

b) On the other hand, if the number of revolutions of the rotary drum is reduced instead of reducing the track pitch, the relative speed between the rotary head and the magnetic tape greatly changes, thereby changing the electromagnetic transducing characteristics of the rotary head. In this case, it is also difficult to keep the good quality of the reproduced video signals.

SUMMARY OF THE INVENTION

Accordingly, it is an object of the present invention to eliminate the above-described problems in the related art and to provide digital video recording system and apparatus which are capable of recording digital video signals without changing the track pitch and the electromagnetic transducing characteristics of the rotary head.

To achieve this aim, in a digital video signal recording system of the present invention, recording in a long recording mode is carried out in the following manner.

a) Recording data in the form of digital video signals are compressed at a data rate of 1/N (N: an integer)

of the data rate adopted in recording in an ordinary recording mode, thereby producing compressed data.

b) The magnetic tape is fed at a speed of 1/N of the speed adopted in recording in an ordinary recording mode.

c) The compressed data for 1 field are recorded in a recording time of 1/N as long as the time for recording uncompressed data in an ordinary recording mode.

As a result, the recording data for 1 field which are recorded in M (M; an integer) tracks in an ordinary recording mode are recorded in about M/N intermittent tracks in a long recording mode.

According to this system, a long recording mode for recording for N times as long hours as those in an ordinary recording mode is realized without changing the track pitch and the number of revolutions of the rotary drum from those in an ordinary recording mode. It is therefore possible to record digital video signals on a magnetic recording while keeping the quality of the reproduced video signals without involving the lowering of the reproducing output, a change in electromagnetic transducing characteristics, etc.

It is also possible to record in a long recording mode by collectively recording digital video signals in L tracks (L: an integer) as a unit by using an L-channel rotary head. In this case, the tracks for one cycle of recording are linear.

A digital video signal recording apparatus according to the present invention includes the following components:

a) a magnetic tape feeding means for feeding a magnetic tape at a constant speed;

b) a rotary head for recording digital recording data in tracks on the magnetic tape;

c) a recording means for
  (1) producing recording data from digital video signals;
  (2) supplying the recording data on the rotary head and recording the data in a track of the magnetic tape in an ordinary recording mode; and
  (3) compressing the recording data at a data rate of 1/N (N: an integer) of the data rate adopted in recording in an ordinary recording mode, thereby producing compressed data, supplying the compressed data to the rotary head as recording data and recording the data in a track of the magnetic tape in a long recording mode; and d) a control means for
  (1) controlling the magnetic tape feeding means in a long recording mode so that the feeding rate of the magnetic tape is 1/N of the rate in an ordinary recording mode; and
  (2) controlling the recording means in a long recording mode so that the recording data for 1 field are recorded in the recording time of 1/N as long as the recording time in an ordinary recording mode.

As a result, the recording data for 1 field are recorded on M (M: an integer) tracks in an ordinary recording mode, and about M/N intermittent tracks in a long recording mode.

According to this apparatus, recording in a long recording mode is enabled while keeping the quality of the reproduced video signals without involving the lowering of the reproducing output, a change in electromagnetic transducing characteristics, etc. It is also possible to collectively record in L tracks as a unit by using an L-channel head in the same way as in the above-described system.

The rotary head is, for example, an L (L: an integer)-channel head provided on the periphery of a rotary drum which rotates at a predetermined angular velocity.

The magnetic tape feeding means includes, for example, a capstan motor, a fixed head and a capstan servo controller. In this structure, the magnetic tape is fed by the capstan motor and a magnetic tape feeding speed control signal is recorded/reproduced by the fixed head into/from the control track which is provided in the longitudinal direction of the magnetic tape. The frequency of the magnetic tape feeding speed control signal reproduced by the fixed head is detected by the capstan servo controller. The capstan servo controller further controls the capstan motor by a servomechanism. It is therefore possible to feed the magnetic tape at a constant speed.

A digital video signal dealt with by the apparatus of the present invention is composed of, for example, segments each of which contains an identification code representing whether it is operated in an ordinary recording mode or in a long recording mode. In this case, the recording means records the recording data for N segments as 1 field on the magnetic tape.

The apparatus of the present invention may be further provided with a reproducing means which operates in the following manner. When the recording data recorded on the magnetic tape are reproduced by the rotary head, the reproduced recording data, namely, the reproducing data are reproduced into digital video signals by the reproducing means. At this time, the reproducing means reproduces the reproducing the data for M tracks in an ordinary recording mode, and the data for intermittent M/N tracks in a long recording mode as 1 field into digital video signals.

The recording means in the apparatus of the present invention includes, for example, the following components:

a) an A/D converter for converting an analog video signal input into a digital video signal;

b) a data compressor for a long recording mode which compresses digital video signals so as to produce compressed data for long recording;

c) a data compressor for an ordinary recording mode which compresses digital video signals at a data rate of 1/N of the data rate adopted for compressed data for long recording, thereby producing compressed data for ordinary recording;

d) a selector on the recording side for reading digital video signals or the compressed data for ordinary recording and the compressed data for long recording, selecting the digital video signals or the compressed data for ordinary recording at the time of ordinary recording and the compressed data for long recording at the time of long recording, respectively, and outputting the selected data as recording data;

e) an encoder for shuffling the recording data and adding an error-correcting code thereto; and f) a modulator for modulating the recording data in a predetermined modulating system.

The reproducing means may be composed of the following components in correspondence with the respective components of the recording means:

g) a demodulator for demodulating the reproduced data in a demodulating system corresponding to the modulating system of the modulator;

h) a decoder for correcting the error of the reproducing data and rearranging the reproduced data according to the rule corresponding to the rule for shuffling and encoding of the encoder;

i) a data expander for an ordinary recording mode which expands the reproduced data and outputs the reproduced data as expanded data for ordinary recording;

j) a data expander for a long recording mode which expands the reproduced data to N times of the data rate of the expanded data for ordinary recording so as to produce expanded data for long recording;

k) a selector on the reproducing side for reading the expanded data for ordinary recording or the reproduced data and the expanded data for long recording, selecting the expanded data for ordinary recording or the reproduced data at the time of ordinary recording and the expanded data for long recording at the time of long recording, respectively, and outputting the data as digital video signals; and l) a D/A converter for converting the digital video signal into an analog video signal.

The above and other objects, features and advantages of the present invention will become clear from the following description of the preferred embodiments thereof, taken in conjunction with the accompanying drawings.

DESCRIPTION OF THE PREFERRED EMBODIMENTS

Preferred Embodiments of the present invention will be explained hereinunder with reference to the accompanying drawings.

Figure 1:
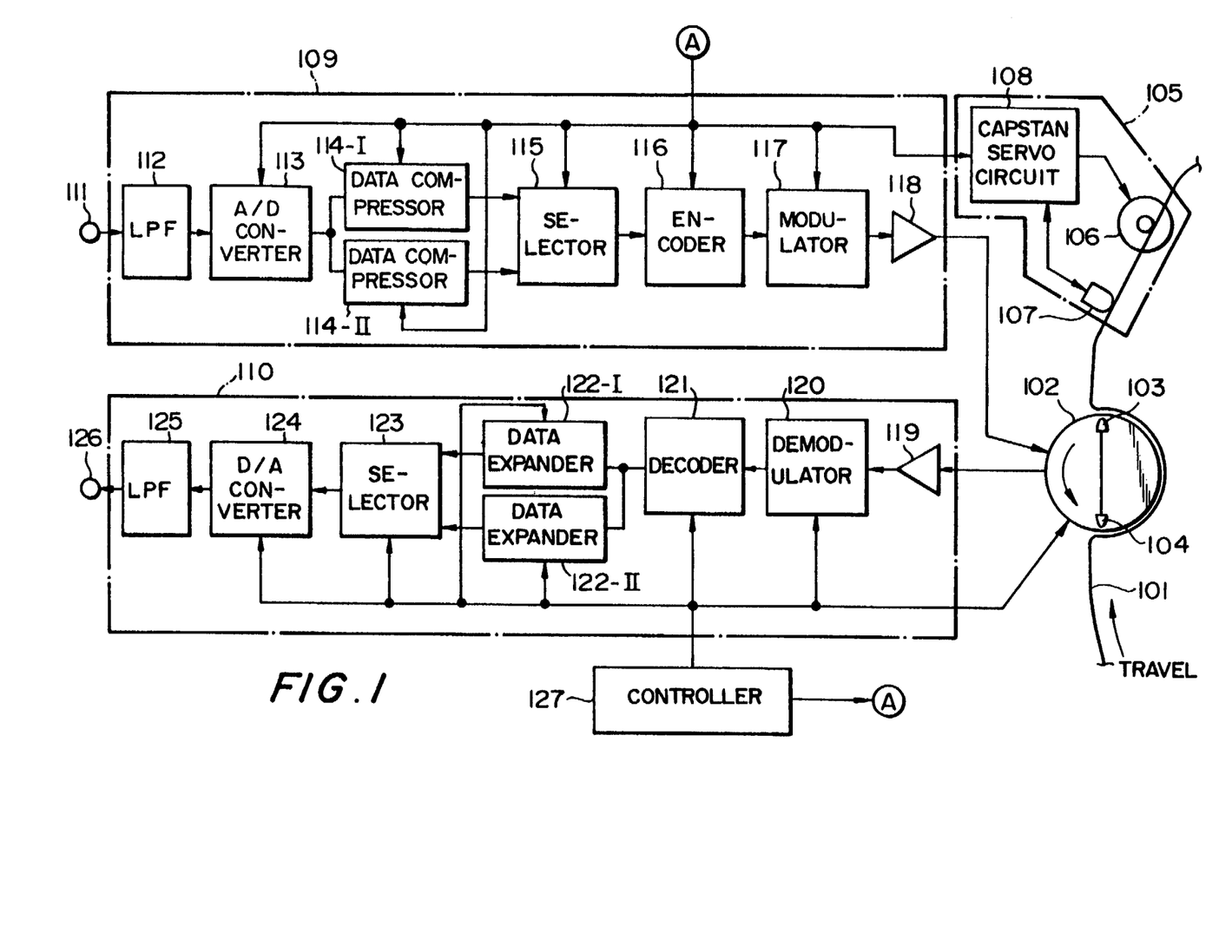
FIG. 1 is a block diagram of the structure of a first embodiment of a digital video signal apparatus according to the present invention.

FIG. 1 shows the structure of a first embodiment of a digital video signal recording apparatus according to the present invention.

The apparatus shown in FIG. 1 includes a rotary drum 102 with a magnetic tape 101 wound half around the periphery thereof and rotary heads 103 and 104 provided on the periphery of the rotary drum 102 at the axially symmetrical positions.

When a signal is supplied to the rotary head 103 or 104 through a rotary transformer (not shown) provided within the rotary drum 102, the signal is recorded on the magnetic tape 101. Reversely, the signal reproduced from the magnetic tape 101 by the rotary head 103 or 104 is externally output through the rotary transformer.

The apparatus of this embodiment also includes a servomechanism 105 for controlling the feeding rate of the magnetic tape 101. The servo mechanism includes a capstan motor 106, a fixed head 107 and a capstan servo circuit 108.

A signal having a frequency of, for example, 30 Hz is written by the fixed head 107 into a CT 101a (see FIGS. 4 and 6) of the magnetic tape 101. The signal written into the CT 101a is reproduced by the fixed head 107. By controlling the rotation of the capstan motor 106 by the capstan servo circuit 108 so that the reproduced CT signal has a constant frequency, the magnetic tape 101 travels at a constant speed.

The apparatus of this embodiment is also provided with a recording portion 109 and a reproducing portion 110.

The signal to be recorded on the magnetic tape 101 by the rotary head 103 or 104 is the signal output from the recording portion 109, and the signals output from the rotary heads 103 and 104 are supplied to the reproducing portion 110.

The recording portion 109 includes an LPF 112, an A/D converter 113, data compressors 114-I and 114-II, a selector 115, an encoder 116, a modulator 117 and a recording amplifier 118.

The analog video signal input into an input terminal 111 is first subjected to band limitation by the LPF 112. For example, when an NTSC composite video signal is input into the input terminal 111, the LPF 112 limits the frequency thereof to the band of 4.2 MHz.

The LPF 112 is connected to the A/D converter 113 for converting an analog video signal to a digital video signal. For example, the video signal with the frequency limited to the band of 4.2 MHz by the LPF 112 is sampled by 4 times as high a frequency as the color subcarrier frequency Fsc (=about 3.58 MHz) by the A/D converter 113, thereby producing quantized 8-bit data.

The rate of the data is about $4 \times Fsc \times 8 = 115$ MBPS, and the rate of the data with vertical and horizontal blanking data removed therefrom, namely, the effective data rate is about 90 MBPS. The data compressor 114-I further compresses the effective data rate to ⅓, namely, 30 MBPS and the data compressor 114-II compresses the effective data rate to about 1/9, namely, 10 MBPS.

The data compressors 114-I and 114-II are connected to the selector 115. The selector 115 selects either the data compressed by the data compressor 114-I or the data compressed by the data compressor 114-II and supplies the selected data to the encoder 116.

The encoder 116 shuffles the data supplied from the selector 115 and adds an error-correcting code thereto. As a result of these processings, the data rate is compressed to about 40 MBPS (when the selector 115 selects the output of the data compressor 114-I) or about 13 MBPS (when the selector 115 selects the output of the data compressor 114-II).

The modulator 117 is connected to the encoder 116. The modulator 117 subjects the signal processed by the encoder 116 in the above-described way to digital modulation. The output of the modulator 117 is supplied to the rotary head 103 or 104 through the recording amplifier 118.

The reproducing portion 110 includes a reproduction amplifier 119, a demodulator 120, a decoder 121, data expanders 122-I, 122-II, a selector 123, a D/A converter 124 and an LPF 125.

The signal reproduced from the magnetic tape 101 by the rotary heads 103 and 104 is first input to the reproduction amplifier 119 and supplied to the demodulator 120. The demodulator 120 digitally demodulates the supplied signal in accordance with the demodulating system which corresponds to the modulating system of the modulator 117 after the equalization, the clock reproduction and signal detection.

The decoder 121 is connected to the demodulator 120. The decoder 121 subjects the data demodulated by the demodulator 120 to time axis correction, error correction and reverse shuffling, and outputs the thus-processed data.

The data output from the decoder 121 is supplied to the data expanders 122-I and 122-II. The data expander 122-I expands the rate of the supplied data to 3 times, while the data expander 122-II expands the rate of the supplied data to 9 times. Therefore, if the data compressed by the data compressor 114-I and recorded on the magnetic tape 101 is expanded by the data expander 122-I, the data with the rate before compression is obtained. Similarly, if the data compressed by the data compressor 114-II and recorded on the magnetic tape 101 is expanded by the data expander 122-II, the data with the rate before compression is obtained.

Namely, original effective data of 90 MBPS rate is obtained.

The selector 123 selects and outputs either the data expanded by the data expander 122-I or the data expanded by the data expander 122-II.

The D/A converter 124 is connected to the selector 123. The D/A converter 124 converts the output of the selector 123 to an analog video signal. The analog video signal is output from an output terminal 126 after the signal out of the band is removed by an LPF 125.

The apparatus shown in FIG. 1 is further provided with a controller 127.

The controller 127 controls the operation timings of the recording portion 109 and the reproducing portion 110, the operation mode of the capstan servomechanism 105 and the recording timings of the rotary heads 103 and 104.

Figure 2:
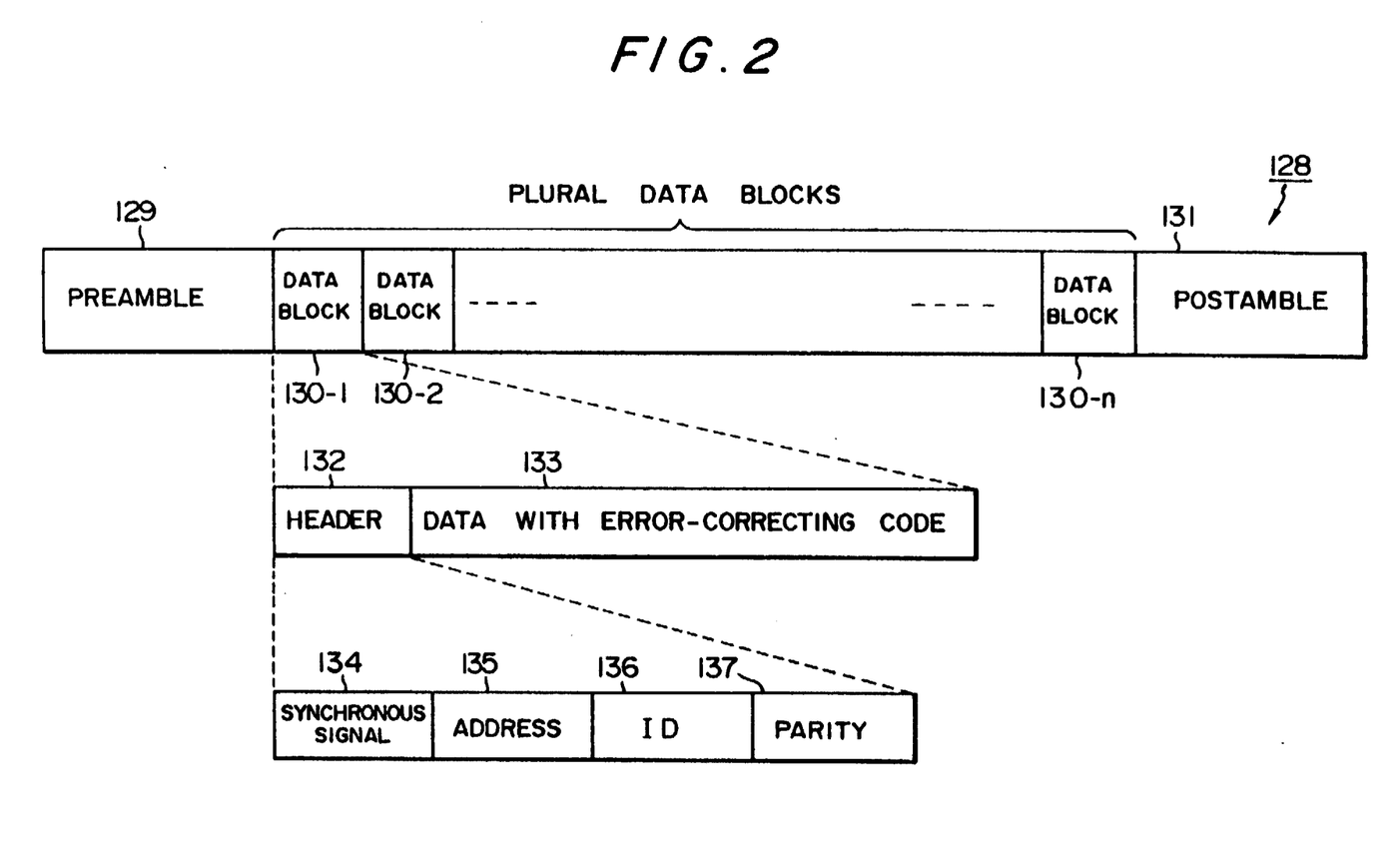
FIG. 2 shows the structure of the data dealt with by the first embodiment shown in FIG. 1, each of the data block including an ID which indicates whether the apparatus is in an ordinary recording mode or in a long recording mode.

The format of the data recorded by the apparatus of this embodiment will now be explained. FIG. 2 shows the format of the data adopted in this embodiment.

As shown in FIG. 2, one segment 128 is composed of a preamble 129, n data blocks 130-1, 130-2, . . . 130-n and a postamble 131.

One data block (e.g., 130-1) is composed of a header 132 and one item of data 133 with an error-correcting code added thereto by the encoder 116.

The header 132 includes a synchronous signal 134, an address 135, an ID 136 and a parity 137.

The ID 136 represents an identification code which indicates whether the apparatus is operated in an ordinary recording mode or in a long recording mode. The recording operations of the apparatus of this embodiment in an ordinary recording mode and in a long recording mode will be explained hereinunder separately from each other.

Figure 3:
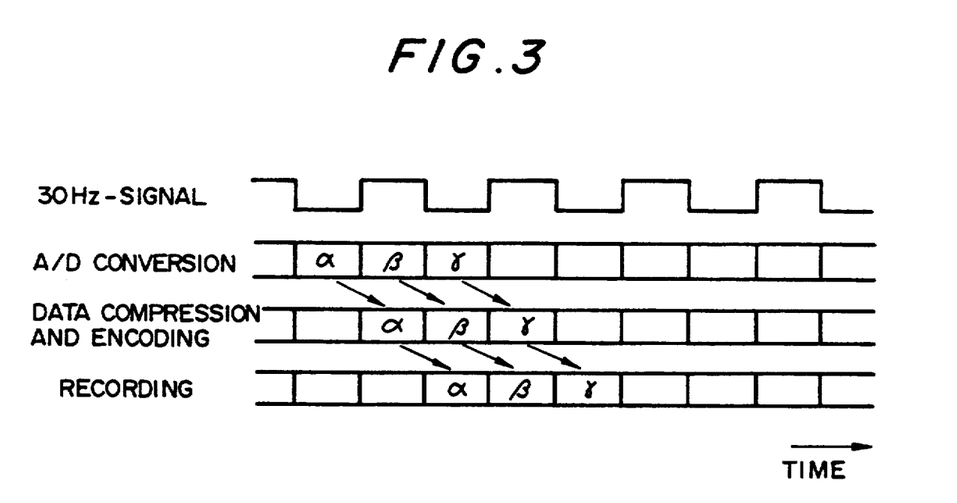
FIG. 3 shows the data transferring timing and the recording timing for recording in an ordinary recording mode in the embodiment shown in FIG. 1.

FIG. 3 shows the operation timing in an ordinary recording mode.

The controller 127 controls the recording portion 109, etc. synchronously with a 30 Hz-signal (in the case of an NTSC video signal).

The controller 127 first instructs the A/D converter 113 to carry out A/D conversion of data $\alpha$ at a certain half period of the 30 Hz-signal.

At the next half period, the controller 127 instructs the data compressor 114-I to compress the data, the selector 115 to select the data compressor 114-I and the encoder 116 to carry out a predetermined processing.

At the next half period, the controller 127 subsequently supplies the data output from the encoder 116 to the modulator 117, the recording amplifier 118 and the rotary head 103 or 104, thereby recording the data on the magnetic tape 101.

In the ordinary recording mode, when data $\alpha$, $\beta$ and $\gamma$ are output in succession, these segments of data are subsequently recorded in that order.

Figure 4:
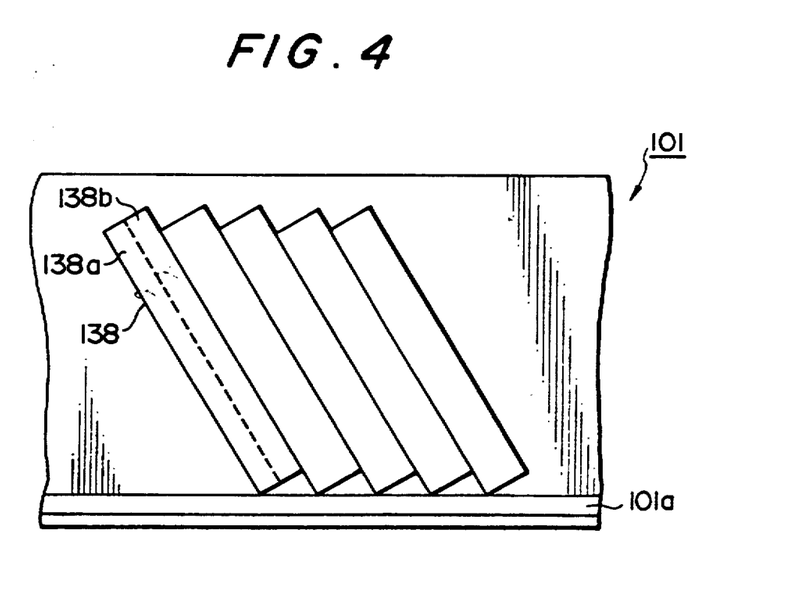
FIG. 4 explains the track pattern for recording in a long recording mode in the embodiment shown in FIG. 1, showing that the portion corresponding to 1 track in an ordinary recording mode is used as 3 tracks.

In the ordinary recording mode, data are recorded in the system shown as a track pattern in FIG. 4.

For example, when the date of 40 MBPS are recorded on the magnetic tape 101 having a width of ½ inch, the rotary drum 102 is rotated at the rate of about 30 rps, and the rotary heads 103 and 104 in the form of two-channel heads are used. In this way, the date for 1 field (1 segment) are recorded in an oblique track 138 (including two tracks 138a and 138b) show in FIG. 4.

Onto the CT 101a of the magnetic tape 101, a 30 Hz-signal is recorded by the fixed head 107.

Figure 5:
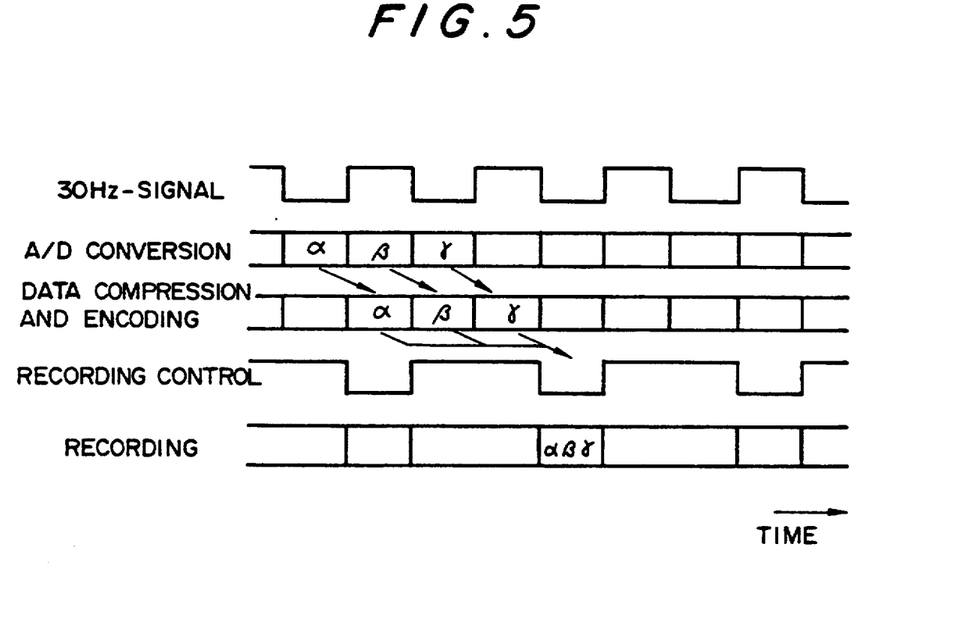
FIG. 5 shows the track pattern for recording in an ordinary recording mode in the embodiment shown in FIG. 1.

FIG. 5 shows the operation timing in a long recording mode. The timing control by the controller 127 is the same as in the ordinary recording mode until the encoding process.

The long recording mode is characterized in that the controller 127 so controls the recording timing that the 3 segments of data $\alpha$, $\beta$ and $\gamma$ are recorded on the magnetic tape 101 at the same timing. In other words, the controller 127 generates a signal which rises at every three half periods of a 30 Hz-signal as a recording control signal.

Figure 6:
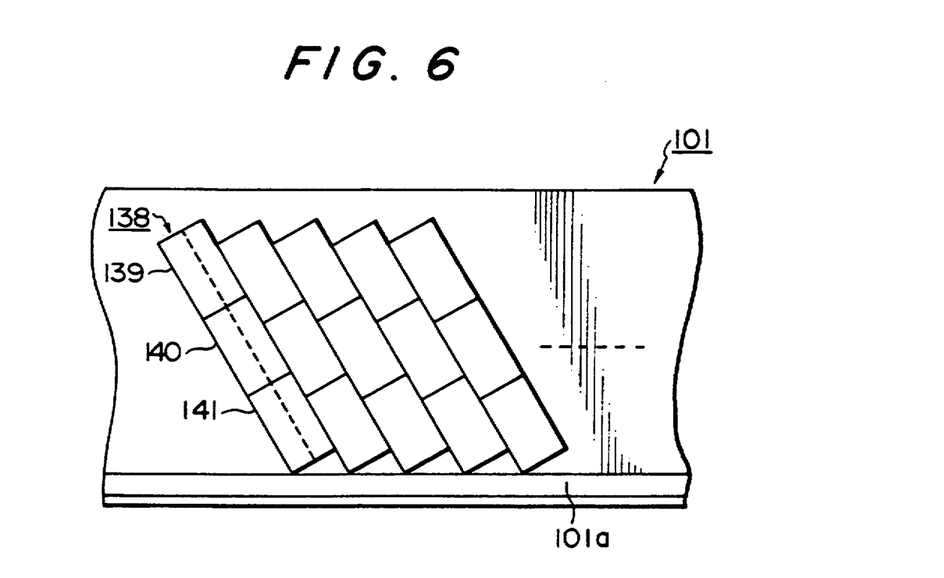
FIG. 6 shows the data transferring timing and the recording timing for recording in a long recording mode in the embodiment shown in FIG. 1 in the state of collectively recording data $\alpha$, $\beta$ and $\gamma$.

FIG. 6 shows the recording system in the long recording mode as a track pattern.

When the three segments of data are collectively recorded on the one oblique track 138 in accordance with the recording control signal, they are recorded in segment areas 139, 140 and 141, respectively.

When the recorded data are reproduced by the apparatus of this embodiment, the controller 127 instructs the selector 123 to select either the output of the data expander 122-I or the output of the data expander 122-II depending upon whether the apparatus is operated in an ordinary recording mode or in a long recording mode.

In this way, according to this embodiment, it is possible to record both in an ordinary recording mode and in a long recording mode without changing the number of revolutions of the rotary drum 102, namely, the electromagnetic transducing characteristics, or changing the track pitch.

Figure 7:
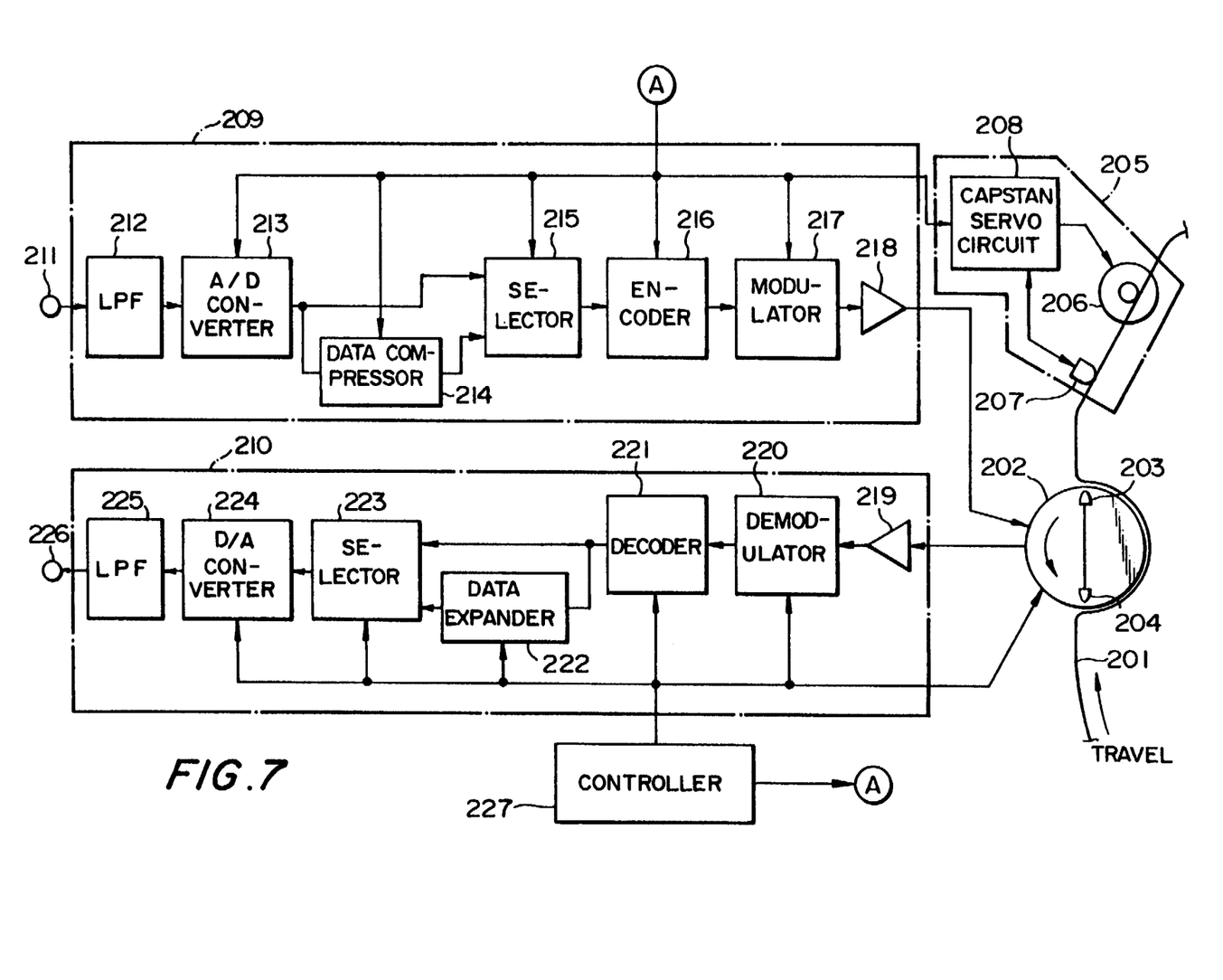
FIG. 7 is a block diagram of the structure of a second embodiment of a digital video signal apparatus according to the present invention.

FIG. 7 shows the structure of a second embodiment of a digital video signal recording apparatus according to the present invention.

This embodiment is different from the first embodiment in that only one data compressor 214 is used, and the output of an A/D converter 213 is directly connected to a selector 215. In correspondence with these differences, only one data expander 222 is used and the output of an encoder 221 is directly connected to a selector 223.

In other words, in a recording portion 209 in this embodiment, the output of the A/D converter 213 is both directly supplied to the selector 215 and compressed to the ⅓ rate by the data compressor 214 before it is supplied to the selector 215. In a reproducing portion 210, the output of the decoder 221 is both directly supplied to the selector 223 and expanded to three times by the data expander 222 before it is supplied to the selector 223.

This embodiment is further different from the first embodiment in the recording system in a long recording mode.

Figure 8:
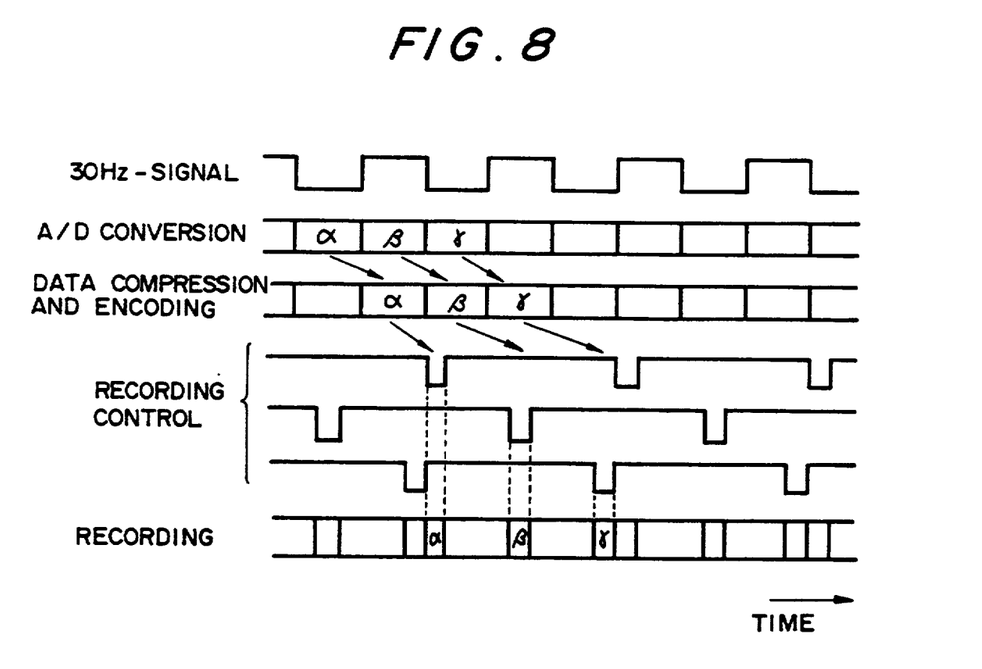
FIG. 8 shows the data transferring timing and the recording timing for recording in a long recording mode in the embodiment shown in FIG. 7.
Figure 9:
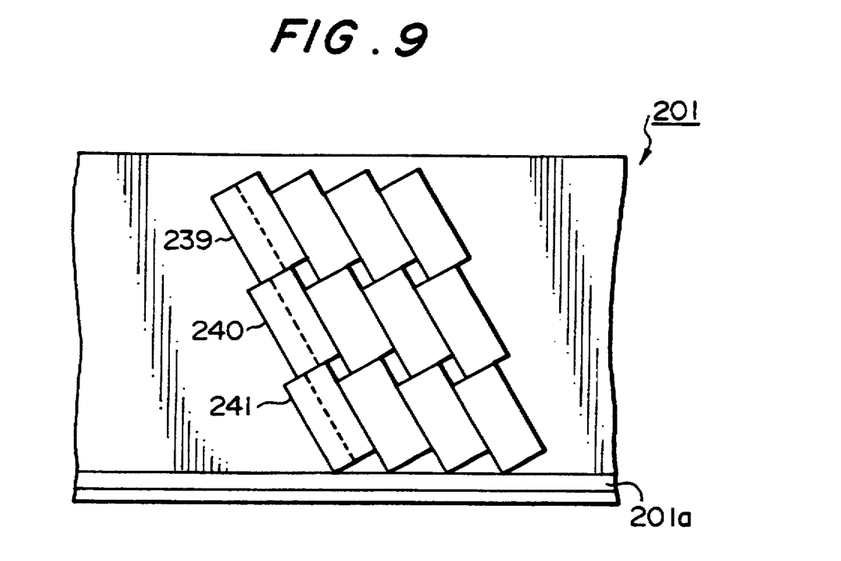
FIG. 9 shows the track pattern for recording in a long recording mode in the embodiment shown in FIG. 7.

FIG. 8 shows the recording timing in a long recording mode in this embodiment, and FIG. 9 shows the track pattern indicating the recording system.

As shown in FIG. 8, in this embodiment, three kinds of recording control signals are generated by a controller 227. These recording control signals are signals which break at different three half periods of a 30 Hz-signal and at different timings in the respective half periods. The data output from an encoder 216 are recorded on a magnetic tape 201 in accordance with the breaking of any of these recording control signals.

If each of the rotary heads 203 and 204 is a two-channel head, three segments of data are recorded in segment areas 239, 249 and 241, respectively.

Thus, according to this embodiment, it is also possible to record both in an ordinary recording mode and a long recording mode without changing the number of revolutions of a rotary drum 202 or the track pitch as in the first embodiment.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A recording apparatus for receiving analog video signals and recording digital representations thereof on a tape, comprising:
   an A/D converter receiving the analog video signals and producing digital video signals therefrom;
   data compression means for compressing the digital video signals at a data rate of 1/N (N being an integer >1) so as to produce compressed video signals;
   means for encoding and modulating the compressed video signals so as to provide digital data segments;
   means for recording the digital data segments on the tape at a predetermined track pitch, said means for recording being responsive to a mode signal wherein if the mode signal indicates an ordinary mode, the means for recording records N data segments on N tracks of the tape in N time intervals, each time interval being one time unit, and wherein if the mode signal indicates a long recording mode, the means for recording records N data segments in one track of the tape in one time interval.

2. The recording apparatus of claim 1, wherein the means for recording includes means for recording on L channels, L being an integer.

3. The recording apparatus of claim 2, wherein the means for recording includes means for recording the digital data segments intermittently in L tracks as a unit in said long recording mode.

4. The recording apparatus of claim 3, wherein the means for recording further includes means for recording an identification code indicating whether said appartus is operating in said long recording mode or in said ordinary recording mode.

5. The apparatus of claim 4, further including means for feeding the tape at a constant speed.

6. The recording apparatus of claim 5, wherein the means for feeding the tape at a constant speed further includes:
   a capstan motor for feeding the tape; and
   a fixed head for recording/reproducing a magnetic tape feeding tape control signal in a controlled track provided in a longitudinal direction of the tape.

7. The apparatus of claim 1, further including means for feeding the tape at a constant speed.

8. The recording apparatus of claim 7, wherein the means for feeding the tape at a constant speed further includes:
   a capstan motor for feeding the tape; and
   a fixed head for recording/reproducing a magnetic tape feeding tape control signal in a controlled track provided in a longitudinal direction of the tape.

9. The recording apparatus of claim 1, wherein the means for encoding and modulating includes means for adding an error-correcting code to the digital data segments.

10. A recording apparatus for receiving analog video signals and recording digital representations thereof on a tape, comprising:
   an A/D converter receiving the analog video signals and producing digital video signals therefrom;
   data compression means for compressing the digital video signals at a data rate of 1/N (N being an integer >1) so as to produce compressed video signals;
   means for encoding and modulating the compressed video signals so as to provide digital data segments;
   means for recording the digital data segments on the tape at a predetermined track pitch, said means for recording being responsive to a mode signal wherein if the mode signal indicates an ordinary mode, the means for recording records N data segments on N tracks of the tape in N time intervals, each time interval being one time unit, and wherein if the mode signal indicates a long recording mode, the means for recording records N data segments in one track on the tape such that each data segment is recorded in 1/N time units.

11. The recording apparatus of claim 10, wherein the means for recording includes means for recording on L channels, L being an integer.

12. The recording apparatus of claim 11, wherein the means for recording includes means for recording the digital data segments intermittently in L tracks as a unit in said long recording mode.

13. The recording apparatus of claim 12, wherein the means for recording further includes means for recording an identification code indicating whether said apparatus is operating in said long recording mode or in said ordinary recording mode.

14. The apparatus of claim 13, further including means for feeding the tape at a constant speed.

15. The recording apparatus of claim 14, wherein the means for feeding the tape at a constant speed further includes:

a capstan motor for feeding the tape; and a fixed head for recording/reproducing a magnetic tape feeding tape control signal in a controlled track provided in a longitudinal direction of the tape.

16. The apparatus of claim 10, further including means for feeding the tape at a constant speed.

17. The recording apparatus of claim 16, wherein the means for feeding the tape at a constant speed further includes:

a capstan motor for feeding the tape; and a fixed head for recording/reproducing a magnetic tape feeding tape control signal in a controlled track provided in a longitudinal direction of the tape.

18. The recording apparatus of claim 10, wherein the means for encoding and modulating includes means for adding an error-correcting code to the digital data segments.

* * * * *